United States Patent [19]

Kim et al.

[11] Patent Number: 5,638,394
[45] Date of Patent: Jun. 10, 1997

[54] BLUE AND GREEN LASER OSCILLATION METHOD AND DEVICE ADOPTING THE SAME

[75] Inventors: Seong-joon Kim, Seoul; Won-ha Choe, Suwon, both of Rep. of Korea; Alexander V. Belov, Moscow, Russian Federation

[73] Assignee: Samsung Electronics Co., Ltd., Rep. of Korea

[21] Appl. No.: 431,832

[22] Filed: May 1, 1995

[30] Foreign Application Priority Data

May 11, 1994 [KR] Rep. of Korea ............ 94-10305
Nov. 9, 1994 [KR] Rep. of Korea ............ 94-29268

[51] Int. Cl.$^6$ ................................ H01S 3/14
[52] U.S. Cl. ................... 372/68; 372/6; 372/41
[58] Field of Search .................. 372/6, 41, 68

[56] References Cited

U.S. PATENT DOCUMENTS

| | | | |
|---|---|---|---|
| 4,284,962 | 8/1981 | Esterowitz et al. | 372/68 |
| 4,347,485 | 8/1982 | Esterowitz et al. | 372/42 |
| 4,949,348 | 8/1990 | Nguyen et al. | 372/41 |
| 5,008,890 | 4/1991 | McFarlane | 372/41 |
| 5,140,598 | 8/1992 | Tagawa et al. | 372/68 |
| 5,151,817 | 9/1992 | Krol et al. | 372/6 |
| 5,245,623 | 9/1993 | McFarlane | 372/41 |
| 5,295,146 | 3/1994 | Gavrilovic et al. | 372/41 |
| 5,299,215 | 3/1994 | Thrash et al. | 372/68 |
| 5,422,907 | 6/1995 | Bhargava | 372/68 |

Primary Examiner—Rodney B. Bovernick
Assistant Examiner—Robert E. Wise
Attorney, Agent, or Firm—Rothwell, Figg, Ernst & Kurz, P.C.

[57] ABSTRACT

A blue and green laser generation method and device adopting the same wherein the method includes the steps of pumping an electron of a first element to a first energy level by employing a first pumping energy to thereby obtain an optoacoustic energy according to a first energy absorption; and pumping an electron of a second element to a second energy level being higher than the first energy level, by employing the optoacoustic energy as a pumping source, to thereby obtain blue and green lasers having a desired wavelength according to a second energy absorption. The device has a core having a predetermined refractive index and which is doped by an element for generating light in a band of a predetermined wavelength by means of energy absorption; and a cladding layer provided around the core and which has a refractive index different from that of the core. The core is doped using at least two elements, one having a higher energy level difference than the other, to thereby enable miniaturization of the device and the mass production of a high performance device having a single mode.

45 Claims, 5 Drawing Sheets

FIG.8
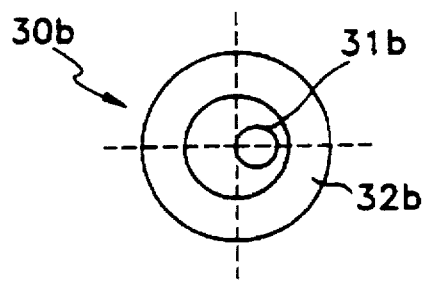
FIG.9
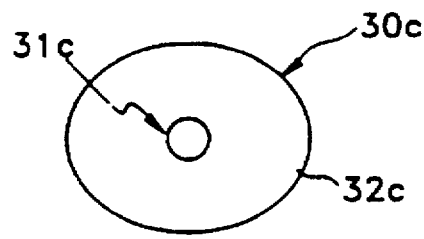
FIG.10
FIG.11
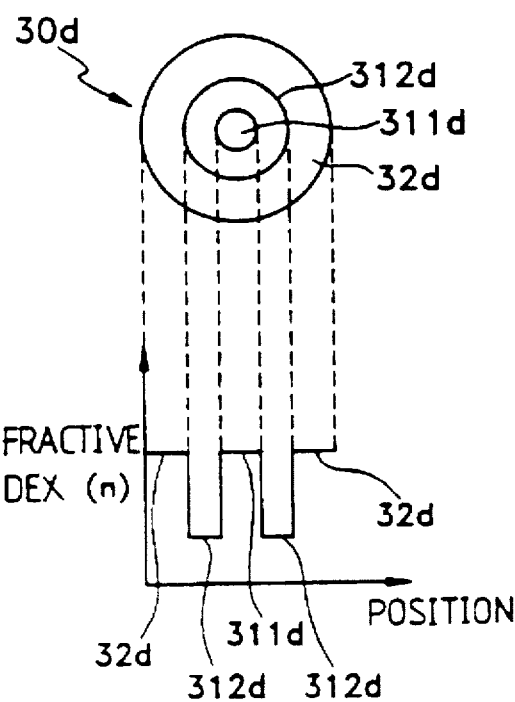

BLUE AND GREEN LASER OSCILLATION METHOD AND DEVICE ADOPTING THE SAME

BACKGROUND OF THE INVENTION

The present invention relates to a laser generation method and device adopting the same, and more particularly, to an efficient method for the generation of blue and green lasers and a device adopting the same.

In a laser generating mechanism, when an intense pumping light irradiates an atom having electron layers with base energy levels, an electron is excited into a higher level due to the energy of the pumping light. Such an excited electron is not in a stable state and thus returns to the base level. The energy absorbed when the electron returns is emitted as a light energy. Here, the wavelength of the emitted light is similar to or longer than that of the pumping light that initially excites the electron.

A laser device generating a light having a shortwavelength, for example, blue and green laser devices, has a wide application and many studies are currently underway in various fields. From an optical viewpoint, shorter wavelength light can be focused more narrowly. Based on such characteristics of light, as the wavelength of light being used for optical recording becomes shorter, the recording density of information is increased. Therefore, far more data can be recorded in the limited region of the existing media currently in use. For this purpose, the light having a short wavelength and good interference is desirable. Therefore, laser diodes are mainly used as a light source.

Shortwave laser diodes have been developed in various types. However, a semiconductor laser diode is in wide use since optimum miniaturization is required.

The currently used semiconductor laser device being in the infrared region generates light having a long wavelength. As a result, there is a limit to the obtainable increase in recording density with respect to a given medium. To overcome such a limitation, the development of a device for generating lased light having a shorter wavelength is an urgent matter. Putting such blue and green laser devices into practical use is time consuming, and there have been many studies on this matter. However, no case shows that the semiconductor laser device oscillates for long periods of time at room temperatures, which is caused by the unique characteristics of the semiconductor material itself.

To obtain the blue and green lasers, second harmonic generating devices using a laser as a pumping energy having a long wavelength, for example, 800 nm to 980 nm, are developed. It should be noted that the blue and green lasers are not generated from the laser device itself, rather the second harmonic generation is one in which the wavelength of the generated infrared light is halved by employing a non-linear optical material within an generation section optically confined by two mirrors. An apparatus for second harmonic generation has a complicated structure and thus limits miniaturization. For example, in a second harmonic generating device, a non-linear bifringent crystalline used for obtaining the second harmonic changes its characteristics depending on temperature variations. Therefore, a multitude of peripheral components for a temperature control are required.

Meanwhile, as another alternative for obtaining a laser having a short wavelength, a frequency up-converted laser device for secondly exciting an electron at the state where the electron is excited by a light having a long wavelength so as to generate a wavelength having a short frequency, is employed.

The frequency up-converted laser device utilizes a second excited state absorption of an electron caused by a pumping light. The principle can be explained as follows.

As shown in FIG. 1, when an atom is irradiated by an external pumping light, electrons are excited from a base level $E_0$ to a first energy level $E_1$. In addition, the once-excited electrons are excited again to a second energy level $E_2$, being higher than first energy level $E_1$, before the electron returns back to the low energy state of level $E_0$. The twice-excited electron directly returns from second energy level $E_2$ to base level $E_0$. As described above, when the electron excited twice returns to base level $E_0$, light is generated. At this time, if an appropriate resonance condition is given to the generated light, a laser is generated. Here, the wavelength is shorter than that of the light being initially incident due to the two excitements of the electron.

Under such a principle, the first energy level difference and the second energy level difference of the electron should be the same when the pumping light is converted from a long wavelength to a short wavelength. The light obtained in such a process is a laser having a short wavelength, i.e., half that of the pumping light having a long wavelength.

To apply such a principle, as shown in FIG. 1, an atom having the same difference between the first energy level and base level and the second energy level and first level, has to be found. As an electron stays longer at the first excited state (level $E_1$), a probability of moving the electron to the second energy state becomes higher. Therefore, it is necessary to make the electron stay longer at first energy level $E_1$.

A frequency up-converted laser device employing such a principle was realized in 1990, and an erbium-doped fluoride fiber laser was disclosed in 1991. Thus, the generation of a laser having a wavelength of 546 nm by employing an infrared ray laser diode having a wavelength of 800 nm as a pumping source results in success. Starting from this, there has been a study on the blue and green laser devices employing a fluoride fiber. For the case of a frequency up-converted laser device employing the second excited state absorption, many developments have been achieved from the standpoint of structure or efficiency, as described in U.S. Pat. No. 5,299,215. However, a fluorine which is difficult to be formed into a fiber-type structure is used as a basic medium material in order to make an electron stay longer at a first excitement level. As for the fluorine, it is difficult to use a modified chemical vapor deposition which is employed as a general method for manufacturing a fiber. Now, as a general method for manufacturing a fiber using the fluorine, there is a built-in casting process which includes a melting process for making the base material of a fiber. Thus, controlling thickness is difficult and doping a predetermined amount of oxygen is impossible. As a result, it is hard to correctly control the diameter of a core which greatly affects the generation mode of a laser, or to miniaturize the core. Further, it is hard to obtain a laser having a single mode by using elements employing such basic medium material due to structural restrictions described above.

SUMMARY OF THE INVENTION

Accordingly, it is an object of the present invention to propose a new concept for generating blue and green lasers from an infrared ray laser and provide a laser generating method and device adopting the above-mentioned new concept.

To accomplish the object of the present invention, there is provided a laser oscillating method comprising the steps of:

pumping an electron of a first element to a first energy level by employing a first pumping energy and emitting an optoacoustic energy according to a first energy absorption; and pumping an electron of a second element to a second energy level which is higher than the first energy level by employing the optoacoustic energy as a pumping source and obtaining blue and green lasers according to a second energy absorption.

To accomplish the above object of the present invention, there is provided a laser device doped by a specific element for generating a light of a predetermined wavelength band by an energy absorption, and which comprises a core having a predetermined refractive index to guide a wave of the generated light into a predetermined region and a cladding layer provided around the core and which has a refractive index different from that of the core, the laser device comprising: at least two elements doped into the core, and either of the two elements has a higher energy level difference than that of the other and generates an optoacoustic energy by employing an external pumping light and another element is excited to a higher energy level by using the generated optoacoustic energy as a pumping source.

To accomplish the above object of the present invention, there is provided a laser generating device comprising: an optical fiber including a core doped by a first metal ion and a second metal ion having different energy level differences and a cladding layer provided around the core; two mirrors provided in the front and back of the optical fiber so as to prepare a resonance section of laser; and a pumping light source provided in the front of the two mirrors so as to inject a pumping light into the resonance section;

whereby an optoacoustic energy is generated from the first metal ion excited by the pumping light and an electron of the second element is excited by the generated optoacoustic energy so as to generate blue and green lights in accordance with an energy absorption of the electron of the second element; and the blue and green lights are changed into blue and green beams due to a resonance occurring in the resonance section.

BRIEF DESCRIPTION OF THE DRAWINGS

The above objects and other advantages of the present invention will become more apparent by describing in detail preferred embodiments thereof with reference to the attached drawings in which:

FIG. 8 is a schematic section view of a fiber of embodiment 3 of the present invention;

FIG. 9 is a schematic section view of a fiber of embodiment 4 of the present invention;

FIG. 10 is a schematic section view of a fiber of embodiment 5 of the present invention;

FIG. 11 is a graphical representation showing a refractive index difference among each portion of the fiber of FIG. 10;

DETAILED DESCRIPTION OF THE INVENTION

The present invention will be explained in more detail with reference to the attached drawings.

Figure 1:
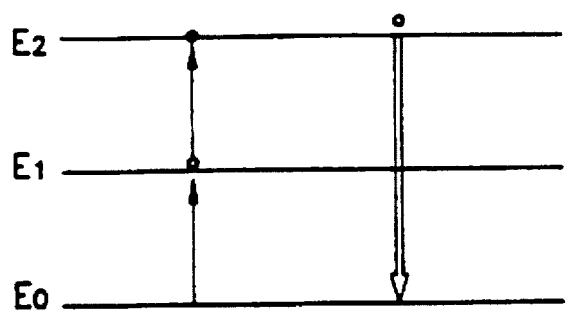
FIG. 1 illustrates energy levels showing a principle of a frequency up-converted laser.
Figure 2A:
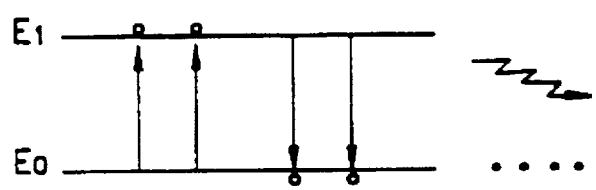
FIGS. 2A and 2B illustrate energy levels showing a principle of a frequency up-converted laser in a semiconductor laser device of the present invention.
Figure 2B:
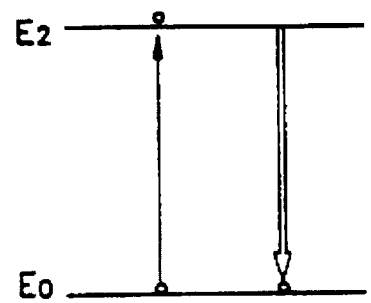

FIGS. 2A and 2B illustrate energy levels showing a laser generation concept of the present invention.

Referring to FIG. 2A, when a strong pumping light is irradiated onto an electron of base energy level $E_0$, an electron of a first atom selected from the group consisting of rare earths is excited and shifted to first energy level $E_1$. Then, the electron goes down energy level $E_0$ due to an unstable energy state. A first energy is emitted by an energy absorption that occurs in the course of lowering the electron to base energy level $E_0$. The emitted energy has a form of optical energy adopting a photon or a non-luminance energy adopting a photon. In the present invention, the first atom is selected in order to use the non-luminance energy form (hereinafter, an optoacoustic energy) adopting the photon. As shown in FIG. 2B, the emitted first energy is transferred to the electron of base energy level $E_0$ of the second atom which is selected from the group consisting of rare earth elements having a different energy level. Here, the electron is excited to second energy level $E_2$ which is higher than first energy level $E_1$.

At this time, an atom having an energy level difference higher than that of the first atom, for example, an atom whose energy level difference is a multiple greater than that of a first atom, is selected as a second atom. As shown in FIG. 2B, the re-excited electron staying at a high energy level for a predetermined time period emits a light energy having a shorter wavelength than that of the original pumping light by returning to a low energy level.

Here, according to the quantum theory of energy level, only when the energy level difference of the electron of the second element is a multiple greater than that of the first element, can the electron of the second element be excited to a further higher energy level $E_2$ by an optoacoustic energy generated by the electron of the first element.

Up-conversion (from element 1 to element 2) of such optoacoustic energy depends on energy transfer material, for example, the host material of the fiber, rather than a characteristic of the element itself. In general, silica is known to have an optoacoustic energy transfer and generation efficiency higher than that of a fluorine-compound material. This is because an energy level difference of silica is greater than that of fluorine, which causes a higher optoacoustic energy resulted from an energy resonance. Accordingly, the present invention is characterized in that silica is employed as a host material of a fiber instead of fluorine which is used in the conventional device. However, in the present invention, silica doped with at least one element selected from the group consisting of aluminum, fluorine, germanium and phosphor can be also employed as the host material of the fiber.

As a doping element for emitting an optoacoustic energy, there is $Yb^{+3}$ among rare earth elements. As an element for generating a second energy, that is, a desired light at a short wavelength band, there is $Tb_{+3}$ among rare earth elements.

Such generation principle is a new concept of the present invention and contrasts with the conventional laser generation concept. In other words, in the conventional frequency up-conversion laser generation concept, a firstly excited electron has to stay at a high energy level for a long time (a number of milliseconds) in order to be excited to a second energy level. In the present invention, the most important point is that the firstly excited electron is changed to an optoacoustic energy while quickly returning to the stable state.

In an embodiment of the present invention, two kinds of atoms and a material for transferring energy between the two atoms are needed. The energy levels of the two atoms should be different as described above, and the difference should be a multiple of two or greater. In addition, it is important to design such that the electron of the first element which is firstly excited emits an optoacoustic energy so as to transfer the energy to the second element.

In addition, consideration on the following points is required in order to generate a laser and enhance the generation efficiency thereof according to the present invention is applied.

First, it is required to enhance a doping ratio of doping elements, for example, Yb:Tb, and optimize the doping ratio between the two elements, and develop a process for the above two matters. The important thing is not laser generation using a single element but doping the elements as much as possible since the energy transfer efficiency between the two elements determines laser efficiency. In addition, optimizing the doping ratio between the two elements is important. The optimization is adjusted according to the sizes of a scattering cross section and absorption cross section of each element, and adjusting from the ratio of 1:1 to 1:100 is possible. Among rare earth ions, terbium ($Tb^{+3}$), samarium ($Sm^{+3}$) and europium ($Eu^{+3}$), have long-wavelength spectrum (ultraviolet, blue and green), and thus can be easily used as a doping element for obtaining blue and green lasers. In addition, such ions have a large energy level difference with respect to silica and thus are affected less by an optoacoustic energy generation caused by silica. As a result, a high performance laser generation is possible.

Second, it is required to improve energy transfer efficiency of a medium material and a fiber structure. Selecting the energy transfer material is very important in order to enhance optoacoustic energy transfer efficiency. Even when the same kind of element is used, the energy generation efficiency depends on the energy transfer material. According to experimentation, since silica has a larger energy level difference than fluorine, a large quantity of energy is changed to an optoacoustic energy before the excited level returns to the base level, thereby making for an excellent optoacoustic energy transfer efficiency. In addition, for the case of a second pumping using a first pumping, generally a pumping efficiency is lowered and a fiber structure that enables as much pumping as possible is needed.

EMBODIMENT

Figure 3:
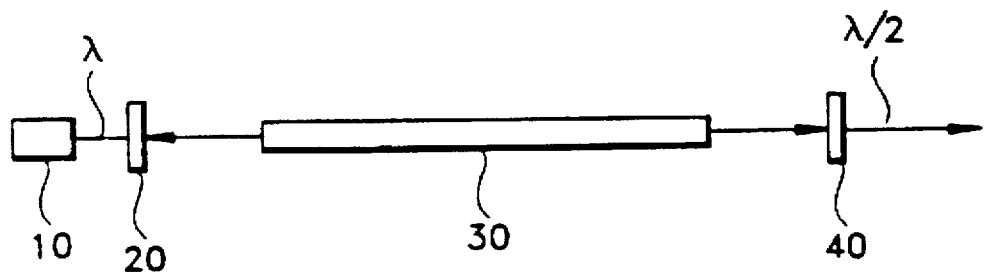
FIG. 3 is a schematic view of a laser generating device of the present invention.
Figure 4:
FIG. 4 is a schematic section view of a fiber of embodiment 1 of the present invention.
Figure 5:
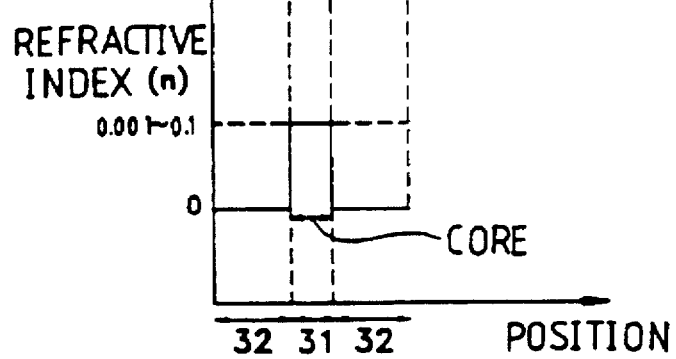
FIG. 5 is a graphical representation showing a refractive index difference among each portion of the fiber of FIG. 4.

FIG. 3 is a schematic view of an embodiment of blue and green laser generating system adopting a method of the present invention. FIG. 4 is a section view of a single mode laser generating device, i.e., optical fiber, adopted to the above system. FIG. 5 illustrates refractive index of the optical fiber in each portion.

Referring to FIG. 3, an optical fiber 30 is on an optical axis and a first and a second mirrors 20 and 40 are prepared in both sides thereof. A laser diode 10 for injecting a pumping light is prepared in front of first mirror 20. First mirror 20 allows only a pumping light and has a high reflection rate with respect to a predetermined short wavelength. Second mirror 40 reflects a pumping light wavelength and allows only the light having a predetermined short wavelength. In addition, the mirrors can be replaced by a coating layer prepared in both ends of optical fiber 30.

In the above-described structure, when a pumping light is injected to the resonance section by laser diode 10, the pumping light resonates in the resonance section. Then, the pumping light is changed to a shortwave light by the above-described principle as the pumping light passes through the optical fiber. Here, the generated shortwave light proceeds in the injection direction of the pumping light, resonates between first and second mirrors 20 and 40, converts to a laser and exits via second mirror 40.

As described above, optical fiber 30 generates blue and green lasers from the injected pumping light. As shown in FIG. 4, optical fiber 30 is made up of a core 31 whereon the pumping light and the blue and green lasers generated therefrom proceed and a cladding layer 32 surrounding core 31 having a diameter of approximately 0.5 µm to 2,000 µm. In addition, cladding layer 32 has a diameter of approximately 10 µm to 20,000 µm. Cladding layer 32 is a silica-compound and core 31 consists of a specific element so that the silica as a host can have a refractive index difference with respect to a cladding layer.

As shown in FIG. 5, core 31 and cladding layer 32 are constituted such that the refractive index of core 31 has a refractive index difference larger than that of cladding layer 32 by 0.001 to 0.1. Such a large difference of refractive index restricts the pumping light irradiated onto core 31 and blue and green lasers generated therefrom to be wave-guided only within core 31.

The core of such optical fiber should have a diameter of micrometers so that the laser can be generated in a single mode. However, injecting a strong pumping light into an interior of the critically reduced core is limited.

Figure 6:
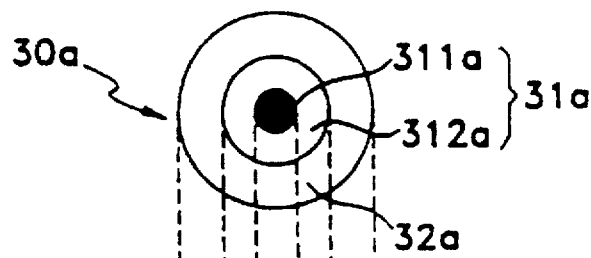
FIG. 6 is a schematic section view of a fiber of embodiment 2 of the present invention.
Figure 7:
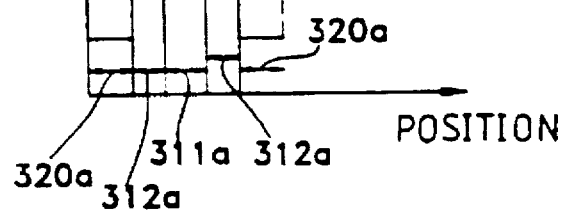
FIG. 7 is a graphical representation showing a refractive index difference among each portion of the fiber of FIG. 6.

To solve the problem, an embodiment of the present invention proposes an optical fiber having a cross section structure as shown in FIG. 6 to FIG. 10. Such structure is suitable for single mode generation. In more detail, as shown in FIG. 6, a second core 312a having a larger diameter than the conventional core and a first core 311a having a smaller diameter than the conventional core are prepared as core 31a instead of the conventional single core. Here, the diameter of the first core ranges approximately from 0.5 µm to 10 µm, and the diameter of second core 312a including first core 311a ranges approximately from 10 µm to 2,000 µm. Then, an outermost cladding layer is prepared. In addition, as shown in FIG. 7, first core 311a has a higher refractive index than second core 312a.

As shown in FIG. 8, core 31b can be deviated to some degree from a center of cladding layer 32b. In addition, as shown in FIG. 9, it is possible to modify the shape of cladding layer 32c into some other shape, for example, an ellipse. However, single mode generation cannot be accomplished by a simple change in the diameter or shape of the core. Therefore, core 31c has to be constituted by first and second cores in order to perform single mode generation as described above.

In addition, as shown in FIG. 11, second core 312d should have a lower refractive index than first core 311d and cladding layer 32d so that first and second cores 311d and 312d can be made up of a pure silica as a base material. That is, since silica itself doped by a predetermined medium-material cannot bring an increase of refractive index, first core 311d is made up of pure silica and second core 312d is made up of the silica containing a material for lowering refractive index. Accordingly, the pure first core 311d of the present invention has a high optoacoustic energy transfer effect as compared with the conventional optical fiber whose core consists of silica and germanium. Here, single mode generation is not affected at all, since the generated laser proceeds consistently at the core of the optical fiber in any case.

As described above, a laser generation device of the present invention can be changed into various types based on the above-described concept. That is, in doping various elements, the doping elements can be changed into a phase of gas or liquid, and thus can be easily controlled. In addition, the kind of medium-material can be easily varied. For the case of a general optical fiber, silica is employed as a basic material due to the simplicity in the manufacturing process and excellent optical characteristics. In the present invention, silica is employed as a basic material due to an advantage in manufacturing process and its excellence as a medium-material for optoacoustic energy transfer which is an essential point of the present invention.

As for an optical energy transfer characteristic difference between silica and fluorine, the silica generally has an absorbent energy level at a long wavelength band. Accordingly, a firstly excited energy level where a great deal of optical absorption occurs at a long wavelength is similar to the energy level of silica. Thus, an optoacoustic energy transfer of a resonance occurs easily. Fluorine has energy levels of longer wavelength and thus has energy levels having more dense spacings than the firstly excited energy levels, which results in dense spacings among electrons of an atom at a first excitement level. Thus, an optoacoustic energy is only slightly generated.

As a result, the firstly excited electron stays longer at its higher level and thus enhances laser efficiency for a conventional second-excited frequency up-converted laser. However, in the present invention, the long stay of electrons at the firstly excited level prevents generating an optoacoustic energy. Accordingly, the present invention is for complementing the drawbacks of optical fiber which employs silica as a medium material and is not used for a second-excited frequency up-converted laser due to a shortening of a lifetime of an electron. In addition, the present invention is only a method for generating a single mode laser which is advantageous for optical data recording, while conventional blue and green laser devices employing a fluorine oscillate in various modes.

An optical fiber of the present invention has a basic structure in that an optical fiber of $Tb^{+3}$:$Yb^{+3}$ is manufactured by a solution deposition and modified chemical vapor deposition. As for manufacturing the optical fiber, the widely used modified chemical vapor deposition is employed in the present invention and terbium and ytterbium for a laser generation are doped into solution forms of 20 ppm and 500 ppm, respectively, within a core.

Figure 12:
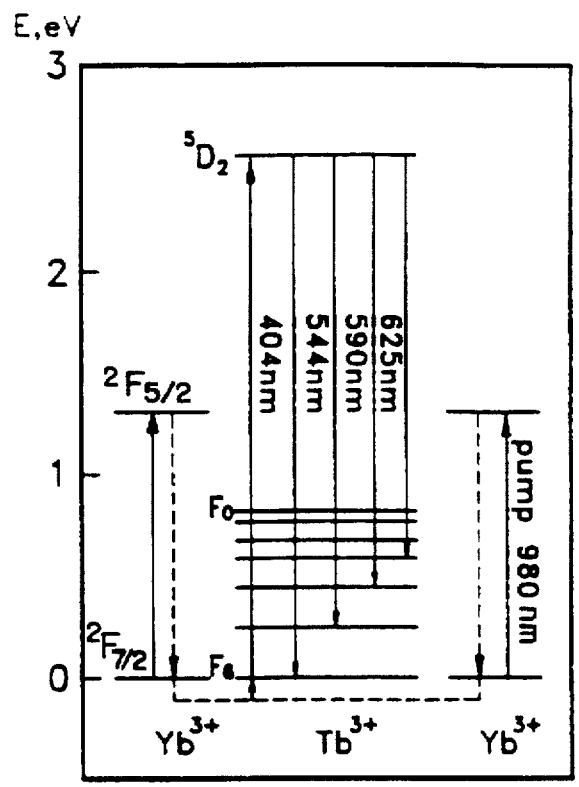
FIG. 12 illustrates energy levels of terbium ion to ytterbium ion ($Tb^{3+}:Yb^{3+}$)

In an embodiment of the present invention, terbium $Tb^{+3}$ is pumped by the optoacoustic energy generated from ytterbium $Yb^{+3}$, i.e., one of rare earth elements. Here, the ytterbium has a strong absorbent spectrum in the near-infrared region of 900 nm to 1,000 nm. When such ytterbium is pumped by employing an infrared laser diode having a wavelength of 980 nm, an electron (called a "transfer electron") of a lower energy level ($^2F_{7/2}$ of FIG. 12) is excited to a higher energy level ($^2F_{5/2}$) as shown in FIG. 12. Here, if the two transfer electrons transfer energy to one electron (called a "receiving electron") having a lower energy ($^7F_6$) of terbium, the receiving electron is directly excited to a higher energy level ($^5D_2$ of FIG. 12) of terbium. The thus-excited receiving electron stays at the excitement state for approximately two to three milliseconds and returns to a lower energy level as shown in FIG. 12 so as to emit light. At this time, according to experimentation, light having a wavelength of 540 nm is generated in the largest quantity. Thus, oscillating the laser having a wavelength of 500 nm is possible by employing a laser diode of 980 nm. As compared with the conventional excited state absorption (ESA) structure, a pumping method by employing ESA requires several pumping processes while the present invention performs a direct pumping to a predetermined excitement state at a base state.

Figure 13:
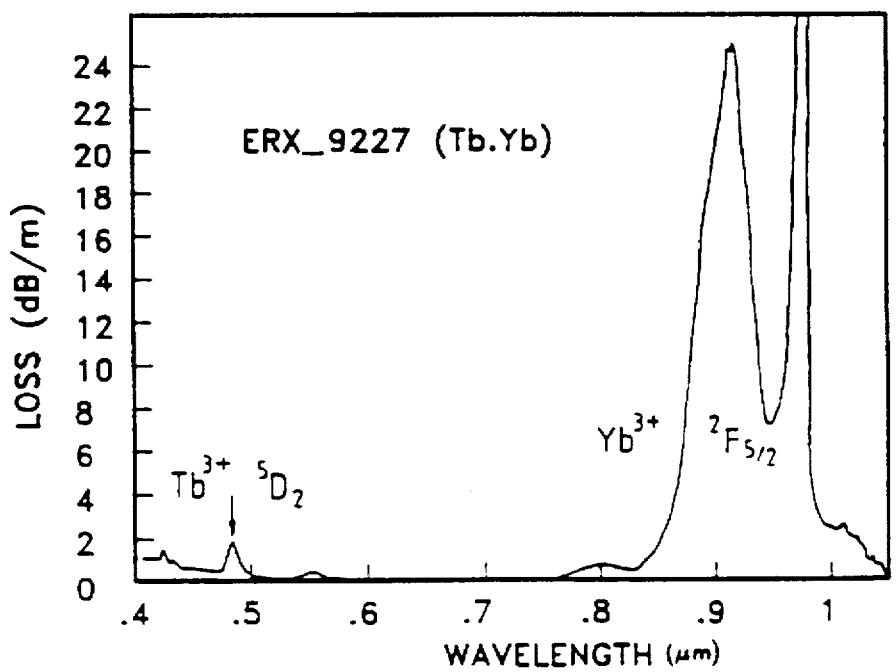
FIG. 13 is a graphical representation of wavelength-loss according to the wavelength of a terbium- and ytterbium-doped fiber.
Figure 14:
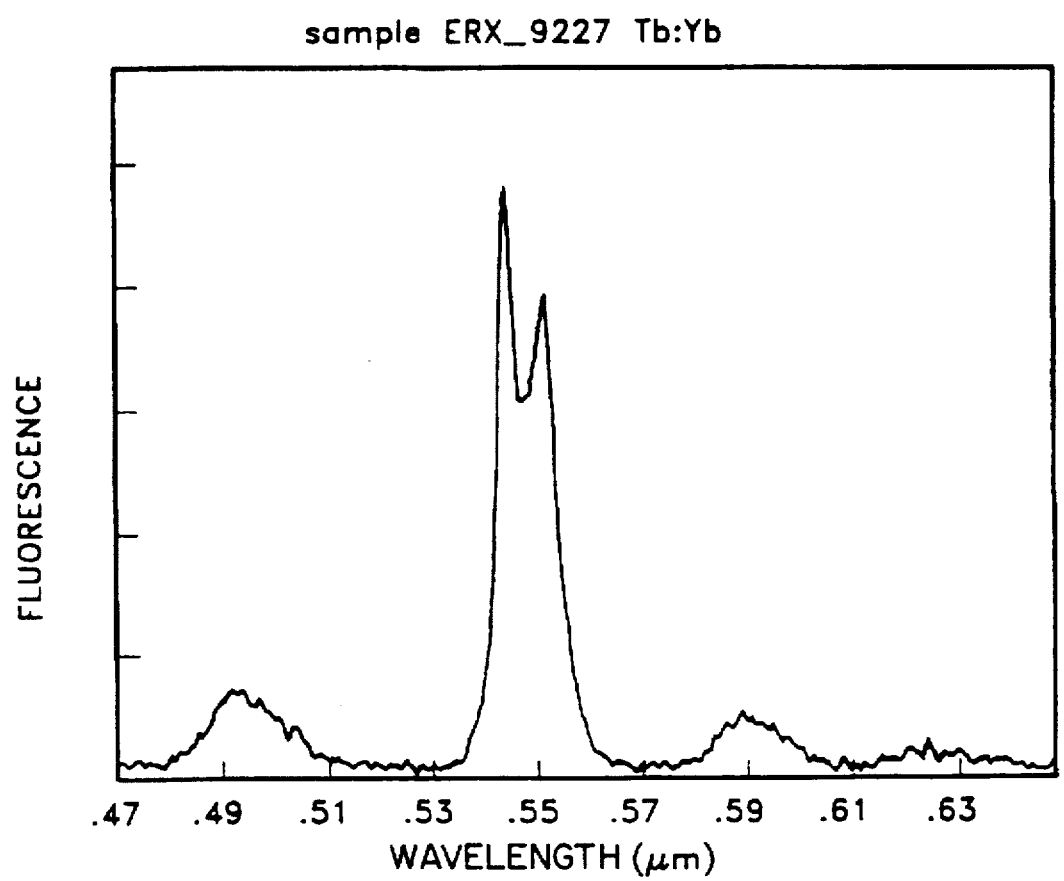
FIG. 14 is a graphical representation of an output spectrum during a pumping is performed at infrared rays of 980 nm according to the present invention.

FIG. 13 and FIG. 14 show embodiments of the present invention. As shown in FIG. 13, an absorption process is performed at an absorption wavelength band of $Tb^{3+}$ and $Yb^{3+}$ by each ion, and an amount of the doped element can be estimated by the degree of loss. As shown in FIG. 14, a pumping is performed by a laser diode of a wavelength of 980 nm and the spectrum of the emitted light is analyzed. FIG. 14 shows that the luminance occurs in the largest quantity at 540 nm.

What is claimed is:

1. A laser generation method comprising the steps of:
   pumping electrons of a first element to a first energy level by employing a first pumping energy, to thereby obtain an energy according to a first energy absorption; and
   pumping electrons of a second element to a second energy level higher than said first energy level by employing said energy as a pumping source and thereby obtaining light energy according to a second energy absorption.

2. A laser generation method according to claim 1, wherein an infrared ray is employed as said first pumping energy.

3. A laser generation method according to claim 1, wherein said first and second elements are selected from among rare earth elements.

4. A laser generation method according to claim 3, wherein ytterbium ($Yb^{3+}$) and terbium ($Tb^{3+}$) are used as said first and second elements, respectively.

5. A laser device comprising:
   a core having a predetermined refractive index and which is doped by at least first and second elements, said second element for generating light in a band of a predetermined wavelength by means of energy absorption; and
   a cladding layer provided around said core, having a refractive index different from that of said core,
   wherein said second element has a higher energy level different from that of said first element and said second element is excitable by the energy emitted by said first element.

6. A laser device according to claim 5, wherein the energy level difference of said second element is larger than that of said first element by a multiple of a integer which is at least two.

7. A laser device according to claim 6, wherein said first and second elements are selected from among rare earth elements.

8. A laser device according to claim 7, wherein ytterbium ($Yb^{3+}$) and terbium ($Tb^{3+}$) are respectively used as said first and second elements.

9. A laser device according to claim 5, wherein said core comprises a first core in the center thereof and a second core surrounding said first core.

10. A laser device according to claim 9, wherein said first and second cores are coaxially formed in the center of a cladding layer.

11. A laser device according to claim 10, wherein said cladding layer has an elliptical cross section.

12. A laser device according to claim 11, wherein said first core is doped using at least two different metal ions selected from among rare earth metals, to thereby have a single-mode generation structure.

13. A laser device according to claim 11, wherein said second core has a diameter of 10–2,000 µm.

14. A laser device according to claim 10, wherein said first core is doped using at least two different metal ions selected from among rare earth metals, to thereby have a single-mode generation structure.

15. A laser device according to claim 10, wherein said first and second cores have silica as a base material.

16. A laser device according to claim 9, wherein said second core is coaxially formed in the center of a cladding layer and said first core deviates by a predetermined distance from said center.

17. A laser device according to claim 16, wherein said cladding layer has an elliptical cross section.

18. A laser device according to claim 17, wherein said first core is doped using at least two different metal ions selected from among rare earth metals, to thereby have a single-mode generation structure.

19. A laser device according to claim 17, wherein said first and second cores have silica as a base material.

20. A laser device according to claim 16, wherein said first core is doped using at least two different metal ions selected from among rare earth metals, to thereby have a single-mode generation structure.

21. A laser device according to claim 16, wherein said first and second cores have silica as a base material.

22. A laser device according to claim 16, wherein said second core has a diameter of 10–2,000 µm.

23. A laser device according to claim 5, wherein said core is formed by a silica doped using at least one element selected from the group consisting of aluminum, fluorine, germanium and phosphor.

24. A laser device according to claim 23, wherein said core is doped using at least two different elements selected from among rare earth elements.

25. A laser device according to claim 24, wherein said two rare earth elements have a doping rate ranging from 1:1 to 1:100.

26. A blue and green laser generating device comprising:
an optical fiber including a core doped by a first metal ion and a second metal ion having different energy level differences and a cladding layer provided around the core;
two mirrors provided in a front and a back of said optical fiber so as to prepare a lasing resonance section of laser; and
a pumping light source provided in the front of either of said two mirrors so as to inject a pumping light into the lasing resonance section,
whereby an optoacoustic energy is generated from said first metal ion excited by said pumping light and an electron of said second element is excited by the generated optoacoustic energy so as to generate blue and green light in accordance with an energy absorption of the electron of said second element; and said blue and green light is changed into blue and green laser beams due to a resonance occurring in said resonance section.

27. A blue and green laser generating device according to claim 26, wherein said first and second mirrors are prepared by a coating layer formed respectively in both ends of said optical fiber.

28. A blue and green laser generating device according to claim 26, wherein an energy level difference of said second element is larger than that of said first element by a multiple of an integer which is at least two.

29. A blue and green laser generating device according to claim 26, wherein said doping elements are selected from among rare earth elements.

30. A blue and green laser generating device according to claim 29, wherein said first and second cores are coaxially formed and are surrounded by a cladding layer.

31. A blue and green laser generating device according to claim 30, wherein said cladding layer has an elliptical cross section.

32. A blue and green laser generating device according to claim 31, wherein said first core is doped using at least two different metal ions selected from among rare earth metals, to thereby have a single-mode generation structure.

33. A blue and green laser generating device according to claim 31, wherein said first and second cores have silica as a base material.

34. A blue and green laser generating device according to claim 30, wherein said first core is doped using at least two different metal ions selected from among rare earth metals, to thereby have a single-mode generation structure.

35. A blue and green laser generating device according to claim 30, wherein said first and second cores have silica as a base material.

36. A blue and green laser generating device according to claim 29, wherein said first core deviates by a predetermined distance from the center of said second core.

37. A blue and green laser generating device according to claim 31, wherein said first and second cores have silica as a base material.

38. A blue and green laser generating device according to claim 36, wherein said cladding layer has an elliptical cross section.

39. A blue and green laser generating device according to claim 38, wherein said first core is doped using at least two different metal ions selected from among rare earth metals, to thereby have a single-mode generation structure.

40. A blue and green laser generating device according to claim 38, wherein said first and second cores have silica as a base material.

41. A blue and green laser generating device according to claim 36, wherein said first core is doped using at least two different metal ions selected from among rare earth metals, to thereby have a single-mode generation structure.

42. A blue and green laser generating device according to claim 26, wherein said core comprises a first core in the center thereof and a second core surrounding said first core.

43. A blue and green laser generating device according to claim 26, wherein said core is formed by a silica doped using at least one element selected from the group consisting of aluminum, fluorine, germanium and phosphor.

44. A blue and green laser generating device according to claim 43, wherein said core is doped using at least two different elements selected from among rare earth elements.

45. A blue and green laser generating device according to claim 44, wherein said two rare earth elements have a doping rate ranging from 1:1 to 1:100.

* * * * *

UNITED STATES PATENT AND TRADEMARK OFFICE
CERTIFICATE OF CORRECTION

PATENT NO. : 5,638,394
DATED : June 10, 1997
INVENTOR(S) : Seong-joon Kim et al.

It is certified that error appears in the above-indentified patent and that said Letters Patent is hereby corrected as shown below:

<u>In the Claims:</u>  Col. 10 (claim 37), line 37, "claim 31" should be -- claim 36 --.

Signed and Sealed this

Ninth Day of September, 1997

Attest:

BRUCE LEHMAN

Attesting Officer

Commissioner of Patents and Trademarks